Patented Jan. 16, 1951

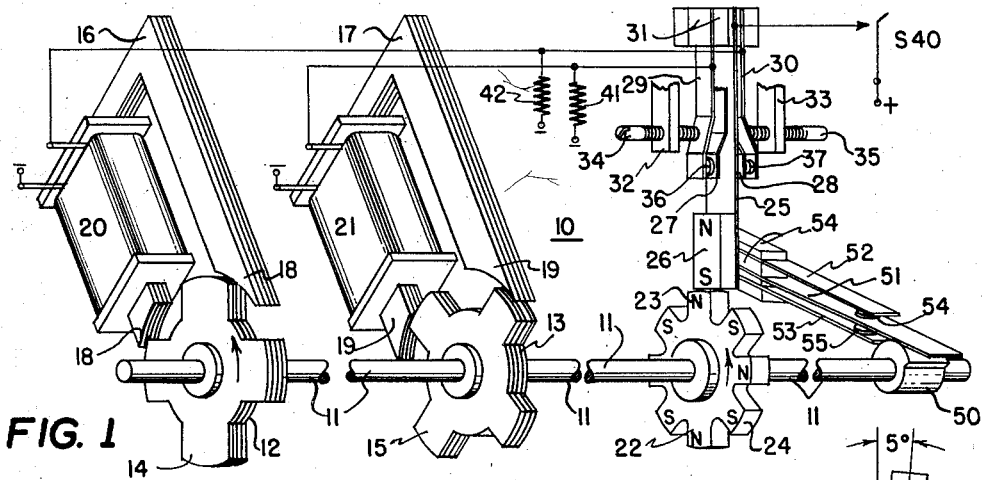

2,538,216

UNITED STATES PATENT OFFICE 2,538,216

ELECTRIC MOTOR

Rudolph Frank Stehlik, Antwerp, Belgium, assignor to Automatic Electric Laboratories, Inc., Chicago, Ill., a corporation of Delaware Application May 14, 1949, Serial No. 93,275

7 Claims. (Cl. 172—36)

1

The present invention relates to electric motors, and more particularly to improved direct current motors of the constant or synchronous speed type.

It is a general object of the present invention to provide an improved electric motor that embodies a vibratory system having a natural period of movement that is sustained by the operation of the motor and a direct current control arrangement governed by the movement of the vibratory system for effecting operation of hte motor so that the speed or operation of the motor is constant and synchronous with the natural period of the vibratory system.

Another object of the invention is to provide an improved electric motor of the type noted which is so constructed and arranged that it has no dead centers and is always self-starting when the direct current operating circuit thereto is closed.

A further object of the invention is to provide an improved electric motor of the type noted that is of simple and economical construction and arrangement and that is positive and efficient in operation.

Further features of the invention pertain to the particular arrangement of the circuit elements of the electric motor, whereby the above-outlined and additional operating features thereof are attained.

The invention both as to its organization and method of operation, together with further objects and advantages thereof, will best be understood by reference to the following specification taken in connection with the accompanying drawing, in which Figure 1 is a fragmentary exploded perspective view of an electric motor embodying the present invention; Fig. 2 is a diagrammatic lay out of certain of the elements of the electric motor shown in Fig. 1, illustrating the angular relation therebetween; and Fig. 3 is a fragmentary end view of a modified form of the electric motor embodying the present invention.

Referring now more particularly to Figs. 1 and 2 of the drawing, the electric motor 10 there illustrated and embodying the features of the present invention is of the direct current constant or synchronous speed type and comprises an operating shaft 11 mounted for rotation in suitable bearings, not shown. The operating shaft 11 carries armature structure that may be in the form of two longitudinally spaced-apart armature elements 12 and 13, the armature elements 12 and 13 being rigidly secured to the

2 operating shaft 11 and rotatable therewith. Preferably each of the armature elements is constructed of a stack of soft iron laminations and comprises a plurality of spaced-apart salient poles angularly displaced from each other by the substantially constant pole pitch P. As illustrated, the armature element 12 may comprise the four salient poles 14, and the armature element 13 may comprise the four salient poles 15.

Stationary field structure is operatively associated with the armature structure and may be in the form of two longitudinally spaced-apart field elements 16 and 17. Preferably each of the field elements is constructed of a stack of soft iron laminations and comprises a pair of spaced-apart projecting poles displaced from each other substantially by the pole pitch P. As illustrated, the field element 16 is substantially U-shaped and includes the pair of projecting poles 18, and the field element 17 is substantially U-shaped and includes the pair of projecting poles 19. Also the field elements 16 and 17 respectively carry electric windings 20 and 21 for the purpose of producing magnetic flux therein so as to effect rotation of the respective armature elements 12 and 13, and consequently the operating shaft 11 in the counterclockwise direction, as explained more fully hereinafter.

Further, the operating shaft 11 carries permanent magnet structure 22 rigidly secured thereto and rotatable therewith, the magnet structure 22 being spaced longitudinally from the armature structure. As illustrated, the magnet structure 22 may be disposed on the right-hand side of the armature element 13, and the armature element 12 may be disposed on the left-hand side of the armature element 13. Preferably the magnet structure 22 is formed of "Alnico," or the like, and comprises twice the number of angularly spaced-apart salient poles of either of the armature elements 12 and 13 displaced from each other by the substantially constant pole pitch ½ P. As illustrated, the magnet structure 22 comprises the eight salient poles 23 and 24 of opposite sense, the characters 23 and 24 indicating north and south poles respectively.

Also the electric motor 10 comprises a resilient element or reed 25 formed of spring steel, or the like, and carrying a permanent bar magnet 26 that may be formed of "Alnico," or the like. Specifically, one end of the reed 25 is rigidly secured to a support, not shown, and the other end of the reed 25 mounts the bar magnet 26, the bar magnet 26 being secured in place in any suitable manner. The reed 25 and the bar magnet 26 constitute a moving system and specifically a compound pendulum having a natural period or frequency of vibration that is determined primarily by the mass of the reed 25 and the bar magnet 26 and by the stiffness of the reed 25, which natural frequency may be assumed to be 40 cycles per second for purposes of illustration. The bar magnet 26 is arranged in cooperating relation with the magnet structure 22 and it may be assumed that a south pole of the bar magnet 26 is disposed adjacent to the magnet structure 22 in cooperating relation with respect to the magnet poles 23 and 24. The reed 25 comprises a normal position displaced longitudinally offset with respect to the magnet structure 22 so that when a north pole 23 of the magnet structure 22 is rotated adjacent to the south pole of the bar magnet 26, the attraction therebetween causes the reed 25 to be moved from its normal position longitudinally toward the left and toward the magnet structure 22, and so that when a south pole 24 of the magnet structure 22 is rotated adjacent to the south pole of the bar magnet 26, the repulsion therebetween causes the reed 25 to be moved back through its normal position longitudinally toward the right and away from the magnet structure 22. In fact, the reed 25 is moved alternately through its normal position between two extreme operating positions respectively disposed on opposite sides thereof as the magnet structure 22 is rotated due to the alternate attraction and repulsion between the north and south poles 23 and 24 respectively of the magnet structure 22 and the south pole of the bar magnet 26. Accordingly, it will be understood that when the operating shaft 11 is rotated ten revolutions per second, or 600 revolutions per minute, the compound pendulum comprising the reed 25 and the bar magnet 26 is vibrated at its natural frequency of 40 cycles per second, or 2400 cycles per minute.

As best shown in Fig. 2, the armature elements 12 and 13 are angularly displaced by ½ P or 45 degrees with respect to each other so that as the operating shaft 11 is rotated in the counterclockwise direction two adjacent salient armature poles 14 lead the pair of field poles 18 while two adjacent salient armature poles 15 lag the pair of field poles 19. From this construction it follows that when two adjacent salient armature poles 14 are arranged in substantial registry with the pair of field poles 18, one of the salient armature poles 15 is disposed substantially intermediate the pair of field poles 19; and conversely when two adjacent salient armature poles 15 are arranged in substantial registry with the pair of field poles 19, one of the salient armature poles 14 is disposed substantially intermediate the pair of field poles 18. The magnet structure 22 is displaced with respect to the armature elements 12 and 13 by a small lagging angle of approximately five degrees in order to improve commutation of the windings 20 and 21 as explained more fully hereinafter. In this figure the reference lines A1, A2 and A3 are disposed in parallel relation and at an angle of approximately 45 degrees with respect to the substantially horizontal base line B, whereby the reference line A1 falls substantially intermediate the two adjacent salient armature poles 14, while the reference line A2 falls substantially along the center line of the two oppositely disposed salient armature poles 15, and while the reference line A3 leads the center line C of the two oppositely directed salient south poles 24 by approximately five degrees.

Also the reed 25 carries two movable contact springs 27 and 28 on opposite sides thereof that respectively cooperate with two stationary contact springs 29 and 30 mounted upon the support, not shown. The reed 25 is electrically connected directly to the movable contact springs 27 and 28, and the reed 25 and the stationary contact springs 29 and 30 are electrically insulated from each other at the fixed ends thereof by suitable intervening insulating strips 31 carried by the support, not shown. Also two standards 32 and 33 are carried by the support, not shown, and respectively receive two adjusting screws 34 and 35 respectively associated with the stationary contact springs 29 and 30. The movable contact spring 27 and the stationary contact spring 29 respectively carry the individual electric contacts of a pair 36, and the movable contact spring 28 and the stationary contact spring 30 respectively carry the individual electric contacts of a pair 37, the pairs of contacts 36 and 37 being arranged to be alternately opened and closed. More particularly, when the bar magnet 26 is moved longitudinally toward a north pole 23 of the magnet structure 22 the reed 25 effects opening of the pair of contacts 37 and closing of the pair of contacts 36; and conversely when the bar magnet 26 is moved longitudinally away from a south pole 24 of the magnet structure 22 the reed 25 effects opening of the pair of contacts 36 and closing of the pair of contacts 37. Accordingly, the pair of contacts 36 is closed when the bar magnet 26 is attracted, and the pair of contacts 37 is closed when the bar magnet 26 is repulsed. In view of the foregoing it will be appreciated that when the compound pendulum is vibrated at its natural frequency of 40 cycles per second, the pairs of contacts 36 and 37 are correspondingly opened and closed at this rate. It will, of course, be understood that by proper adjustments of the screws 34 and 35 the individual contacts of the respective pairs 36 and 37 may be properly adjusted for the required percentage make and the required percentage break within each cycle of vibration of the reed 25.

Further, the electric motor 10 comprises an operating and control circuit including a direct current source of supply, such, for example, as a 48-volts D. C. battery of the character normally provided in a telephone exchange, the positive and negative terminals of which are respectively indicated by the plus and minus signs. Also the circuit comprises a master switch S40 that is adapted when closed to connect the positive terminal of the battery to the reed 25 and consequently to the movable contact springs 27 and 28 and the supported individual contacts. The stationary contact spring 29 is wired directly to one terminal of the winding 21, the other terminal of the winding 21 being connected directly to the negative terminal of the battery. Likewise, the stationary contact spring 30 is wired directly to one terminal of the winding 20, the other terminal of the winding 20 being connected directly to the negative terminal of the battery. Also, two high resistance impedance elements 41 and 42 are respectively bridged across the windings 21 and 20 for the purpose of dissipating inductive voltage kicks from the respective windings 21 and 20 incident to opening of the respective contact pairs 36 and 37, in order to minimize arcing between the individual contacts of the respective pairs 36 and 37.

Considering now in greater detail the operation of the electric motor 10, it will be understood that when the master switch S40 is closed, current is supplied to one of the windings 21 or 20 depending upon which of the pairs of contacts 36 or 37 is closed which circumstance depends upon the position of the bar magnet 26 and the consequent stopped position of the magnet structure 22 and the operating shaft 11. In the case illustrated the north pole 23 of the magnet structure 22 has stopped adjacent to the south pole of the bar magnet 26 attracting the bar magnet 26 and moving the reed 25 to open the pair of contacts 37 and to close the pair of contacts 36. Accordingly, in the present example when the master switch S40 is closed, the winding 21 is energized, whereby the magnetic flux built up in the field element 17 attracts the two adjacent salient armature poles 15 of the armature element 13 rotating the shaft 11 in the counterclockwise direction. As the two salient armature poles 15 of the armature element 13 are rotated in the counterclockwise direction into substantial registry with the two projecting poles 19 of the field element 17 the north pole 23 of the magnet structure 22 is rotated away from the south pole of the bar magnet 26 and the adjacent south pole 24 of the magnet structure 22 is rotated adjacent to the south pole of the bar magnet 26, whereby the bar magnet 26 is repelled. When the bar magnet 26 is thus repelled the reed 25 is moved to open the pair of contacts 36 and to close the pair of contacts 37, whereby the circuit for energizing the winding 21 is interrupted and the circuit for energizing the winding 20 is completed. The magnetic flux in the field element 17 collapses and the magnetic flux in the field element 16 is built up. Thus the projecting poles 18 of the field element 16 attract the two adjacent salient armature poles 14 of the armature element 12 effecting further rotation of the operating shaft 11 in the counterclockwise direction. As the two salient armature poles 14 of the armature element 12 are rotated in the counterclockwise direction into substantial registry with the two projecting poles 18 of the field element 16 the south pole 24 of the magnet structure 22 is rotated away from the south pole of the bar magnet 26 and the adjacent north pole 23 of the magnet structure 22 is rotated adjacent to the south pole of the bar magnet 26, whereby the bar magnet 26 is attracted. When the bar magnet 26 is thus attracted the reed 25 is moved to open the pair of contacts 37 and to close the pair of contacts 36, whereby the circuit for energizing the winding 20 is interrupted and the circuit for energizing the winding 21 is completed. The magnetic flux in the field element 16 collapses and the magnetic flux in the field element 17 is built up. Thus the projecting poles 19 of the field element 17 again attract the two adjacent salient armature poles 15 of the armature element 13 effecting further rotation of the operating shaft 11 in the counterclockwise direction.

This rotation of the magnet structure 22 carried by the operating shaft 11 in the counterclockwise direction effects vibration of the compound pendulum including the reed 25 and the bar magnet 26 at its natural frequency of 40 cycles per second alternately opening and closing the pairs of contacts 36 and 37. In turn, the alternate opening and closing of the pairs of contacts 36 and 37 forty times per second causes the field windings 20 and 21 to be energized intermittently at this rate so that the forty impulses per second transmitted to the armature elements 12 and 13 by the respective field windings 20 and 21 bring about rotation of the operating shaft 11 at a speed of 10 revolutions per second. Thus it will be understood that the natural frequency of vibration of the compound pendulum sets the speed of rotation of the operating shaft 11 at the fixed speed of 600 R. P. M. The relationship of the natural frequency of 40 cycles per second of the moving system or compound pendulum and the synchronous speed of 600 R. P. M. of the operating shaft 11 follows from the provision of four salient poles upon each of the armature elements 12 and 13 and eight salient poles upon the magnet structure 22. Of course, it will be understood that by employing the moving system having the natural frequency of 40 cycles per second in conjunction with other numbers of salient poles on the armature elements 12 and 13 and on the magnet structure 22 other synchronous speeds of the operating shaft 11 may be obtained; and likewise, by altering the natural frequency of the moving system employing the salient pole elements illustrated, other synchronous speeds of the operating shaft 11 may be obtained.

The small angular lag of approximately five degrees in the angular position of the magnet structure 22 with respect to the angular positions of the armature elements 12 and 13 assists in commutation in that a small time interval is consumed in the movement of the compound pendulum between its two extreme operating positions, and a portion of this small time interval is consumed in effecting closure of the pairs of contacts 36 and 37 and the consequent energization of the respective windings 21 and 20. This lagging arrangement compensates for the circumstance that the bar magnet 26 does not begin its movement away from either of its extreme operating positions until the adjacent salient pole 23 or 24 on the magnet structure 22 has moved slightly beyond its center line position with respect to the bar magnet 26. As indicated in Fig. 2, the center line M of the bar magnet 26 is disposed along the radius toward the center of the operating shaft 11 and is displaced in the lagging direction approximately five degrees from the reference line N disposed normal to the base reference line B.

The electric motor 10 has no dead centers and when the master switch S40 is opened operation thereof is arrested, whereby the operating shaft 11 always stops either with one of the north poles 23 on the magnet structure 22 attracting the south pole of the bar magnet 26, or with one of the south poles 24 on the magnet structure 22 repelling the south pole of the bar magnet 26. This operation results from the circumstance that the forces of attraction or repulsion between the north and south poles 23 and 24 on the magnet structure 22 and the south pole of the bar magnet 26 are sufficiently great to rotate the operating shaft 11 into one of the positions noted after the master switch S40 has been operated to its open position and the kinetic energy in the rotating parts has been dissipated by friction and windage and load losses. Accordingly, when the operating shaft 11 is at rest it occupies one of the two positions noted, whereby either the contacts 36 or the contacts 37 are closed. When the master switch S40 is then closed, the winding 21 is first energized in the event the contacts 36 are initially closed, while the winding 20 is first energized in the event the contacts 37 are initially closed. In any case upon closure of the master switch S40 the operating shaft 11 is started in the counterclockwise direction and shortly attains its synchronous speed of 600 R. P. M. established by the natural frequency of 40 cycles per second of the moving system or compound pendulum.

Finally, the motor 10 comprises an impulsing cam 50 formed of insulating material and rigidly secured to the operating shaft 11 adjacent to the magnet structure 22, and three associated impulsing springs 51, 52 and 53. The rear ends of the impulsing springs 51, 52 and 53 are rigidly secured in insulated relation to each other upon the support, not shown, by a plurality of intervening insulating strips 54; while the extreme front end of the impulsing springs 51 rides the impulsing cam 50. The impulsing springs 51 and 52 carry a pair of impulsing contacts 54, while the impulsing springs 51 and 53 carry a pair of impulsing contacts 55. As the operating shaft 11 is rotated in the counterclockwise direction the impulsing spring 51 is moved with respect to the impulsing springs 52 and 53 alternately opening and closing the impulsing contacts 54 and 55. Since the operating shaft 11 rotates at 600 R. P. M. each of the pairs of impulsing contacts 54 and 55 is adapted to transmit 600 complete impulses per minute over an associated electric circuit for use in an electric control system, or the like, not shown.

Referring now to Fig. 3, a fragmentary portion of a modified form of the electric motor 60 is there illustrated that comprises a rotatably mounted operating shaft 61 having a single armature element 62 rigidly secured thereto for rotation therewith. Also the motor 60 comprises two field elements 63 and 64 commonly cooperating with the armature element 62, the field element 63 and 64 respectively carrying field windings 65 and 66. In this arrangement the pair of projecting poles 67 provided on the field element 63 cooperate in lagging relation with two adjacent ones of the salient armature poles 68 provided on the armature element 62, while the pair of projecting poles 69 provided on the field element 64 cooperate in leading relation with two other adjacent ones of the salient armature poles 68 provided in the armature element 62. The remainder of the structure of the motor 60 as well as the relationship thereof with respect to the armature element 62 are the same as that described in conjunction with the electric motor 10. In fact, it will be understood that the projecting poles 67 on the field element 63 bear the same relationship with respect to the salient armature pole 68 on the armature element 62 as do the projecting poles 18 of the field element 16 with respect to the salient poles 14 on the armature element 12; while the projecting poles 69 on the field element 64 bear the same relationship with respect to the salient armature pole 68 on the armature element 62 as do the projecting poles 19 on the field element 17 with respect to the salient poles 15 on the armature element 13. Of course, it will be understood that in the motor 60 the field windings 65 and 66 are alternately energized by the associated moving system in order to effect rotation of the operation shaft 61 at the synchronous speed of 600 R. P. M.; all in the manner described in conjunction with the electric motor 10.

In view of the foregoing, it will be understood that in the electric motors 10 and 60 the arrangement of the two field elements cooperating with the armature structure not only doubles the normal power ratings of the electric motors, but positively prevents dead centers therein, whereby the electric motors are rendered self-starting regardless of the stopped positions of the operating shafts thereof, thereby eliminating the necessity for complicated associated electric circuit starting apparatus.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An electric motor comprising rotatable armature structure having a plurality of spaced-apart poles, field structure having first and second pairs of spaced-apart poles, said armature poles and said field poles being arranged in cooperating relation so that when two of said armature poles are rotated into substantial registry with one of said pairs of field poles another of said armature poles is rotated substantially intermediate the other of said pairs of field poles, first and second field windings respectively coupled to said first and second pairs of field poles, rotatable magnet structure connected to said rotatable armature structure and having a number of spaced-apart poles of alternate sense, a movable magnet having a pole of a predetermined sense cooperating with said rotatable magnet poles so that said movable magnet pole is alternately attracted and repelled by said rotatable magnet poles when said rotatable magnet structure is rotated, first and second contacts positioned to be alternately closed and opened by movements of said movable magnet, said rotatable armature poles and said rotatable magnet poles being so related that said movable magnet respectively opens said first contacts and closes said second contacts when two of said armature poles are rotated into substantial registry with said first pair of field poles and respectively opens said second contacts and closes said first contacts when two of said armature poles are rotated into substantial registry with said second pair of field poles, first and second direct current circuits respectively including said first and second contacts for respectively energizing said first and second field windings, and means for establishing a predetermined period of movement of said movable magnet in order to establish a corresponding synchronous speed of rotation of said armature structure.

2. An electric motor comprising rotatable armature structure having a plurality of spaced-apart poles, field structure having first and second pairs of spaced-apart poles, said armature poles and said field poles being arranged in cooperating relation so that when two of said armature poles are rotated into substantial registry with one of said pairs of field poles another of said armature poles is rotated substantially intermediate the other of said pairs of field poles, first and second field windings respectively coupled to said first and second pairs of field poles, rotatable magnet structure connected to said rotatable armature structure and having a number of spaced-apart poles of alternate sense, a movable magnet having a pole of a predetermined sense cooperating with said rotatable magnet poles so that said movable magnet pole is alternately attracted and repelled by said rotatable magnet poles when said rotatable magnet structure is rotated, first and second contacts positioned to be alternately closed and opened by movements of said movable magnet, said rotatable armature poles and said rotatable magnet poles being so related that said movable magnet respectively opens said first contacts and closes said second contacts when two of said armature poles are rotated into substantial registry with said first pair of field poles and respectively opens said second contacts and closes said first contacts when two of said armature poles are rotated into substantial registry with said second pair of field poles, first and second direct current circuits respectively including said first and second contacts for respectively energizing said first and second field windings, and means including a resilient element for supporting said movable magnet, said resilient element and said movable magnet constituting a compound pendulum having a predetermined period of movement establishing a corresponding synchronous speed of rotation of said armature structure.

3. An electric motor comprising a rotatable shaft, rotatable armature structure carried by said shaft and having a plurality of spaced-apart poles, field structure having first and second pairs of spaced-apart poles, said armature poles and said field poles being arranged in cooperating relation so that when two of said armature poles are rotated into substantial registry with one of said pairs of field poles another of said armature poles is rotated substantially intermediate the other of said pairs of field poles, first and second field windings respectively coupled to said first and second pairs of field poles, rotatable magnet structure carried by said shaft and having a number of spaced-apart poles of alternate sense, a vibratory element, a movable permanent magnet carried by said vibratory element and having a pole of a predetermined sense cooperating with said rotatable magnet poles so that said movable magnet pole is alternately attracted and repelled by said rotatable magnet poles when said rotatable magnet structure is rotated, first and second contacts positioned to be alternately closed and opened by movements of said movable magnet, said rotatable armature poles and said rotatable magnet poles being so related that said movable magnet respectively opens said first contacts and closes said second contacts when two of said armature poles are rotated into substantial registry with said first pair of field poles, and respectively opens said second contacts and closes said first contacts when two of said armature poles are rotated into substantial registry with said second pair of field poles and first and second direct current circuits respectively including said first and second contacts for respectively energizing said first and second field windings, said vibratory element and said movable magnet having a natural frequency of vibration establishing a corresponding synchronous speed of rotation of said armature structure.

4. An electric motor comprising a rotatable shaft, first and second rotatable armatures carried by said shaft and each having a plurality of poles spaced apart by a predetermined pole pitch, first and second pairs of field poles each spaced apart by said predetermined pole pitch, said first and second armatures respectively cooperating with said first and second pairs of field poles and being so related that two armature poles of said first armature lead said first pair of field poles by substantially one half said predetermined pole pitch when two armature poles of said second armature lag said second pair of field poles by substantially one half said predetermined pole pitch, first and second field windings respectively coupled to said first and second pairs of field poles, rotatable magnet structure carried by said shaft and having a number of poles spaced apart by substantially one half said predetermined pole pitch, a movable magnet having a pole of a predetermined sense cooperating with said rotatable magnet poles so that said movable magnet pole is alternately attracted and repelled by said rotatable magnet poles when said rotatable magnet structure is rotated, first and second contacts positioned to be alternately closed and opened by movements of said movable magnet, said first and second rotatable armatures and said rotatable magnet structure being so related that said movable magnet respectively opens said first contacts and closes said second contacts when two poles of said first armature are rotated into substantial registry with said first pair of field poles and respectively opens said second contacts and closes said first contacts when two poles of said second armature are rotated into substantial registry with said second pair of field poles, first and second direct current circuits respectively including said first and second contacts for respectively energizing said first and second field windings, and means for establishing a predetermined period of movement of said movable magnet in order to establish a corresponding synchronous speed of rotation of said armature structure.

5. An electric motor comprising a rotatable armature having a plurality of poles spaced apart by a predetermined pole pitch, first and second pairs of field poles each spaced apart by said predetermined pole pitch, said armature poles commonly cooperating with said first and second pairs of field poles and being so related that two of said armature poles lead said first pair of field poles by substantially one half said predetermined pole pitch when another two of said armature poles lag said second pair of field poles by substantially one half said predetermined pole pitch, first and second field windings respectively coupled to said first and second pairs of field poles, rotatable magnet structure carried by said shaft and having a number of poles spaced apart by substantially one half said predetermined pole pitch, a movable magnet having a pole of a predetermined sense cooperating with said rotatable magnet poles so that said movable magnet pole is alternately attracted and repelled by said rotatable magnet poles when said rotatable magnet structure is rotated, first and second contacts positioned to be alternately closed and opened by movements of said movable magnet, said rotatable armature poles and said rotatable magnet poles being so related that said movable magnet respectively opens said first contacts and closes said second contacts when two of said armature poles are rotated into substantial registry with said first pair of field poles and respectively opens said second contacts and closes said first contacts when two of said armature poles are rotated into substantial registry with said second pair of field poles, first and second direct current circuits respectively including said first and second contacts for respectively energizing said first and second field windings, and means for establishing a predetermined period of movement of said movable magnet in order to establish a corresponding synchronous speed of rotation of said armature structure.

6. In combination, a rotatable shaft, rotatable magnet structure carried by said shaft and having a number of poles of alternate sense spaced apart by a predetermined angular pitch, a movable magnet having a pole of a predetermined sense cooperating with said rotatable magnet poles so that said movable magnet pole is alternately attracted and repelled by said rotatable magnet poles when said rotatable magnet structure is rotated, first and second contacts positioned to be alternately closed and opened by movements of said movable magnet, first and second electric windings, first and second electric circuits respectively including said first and second contacts for respectively energizing said first and second electric windings, means responsive to energization of either one of said electric windings for rotating said shaft said predetermined angular pitch, and means for establishing a predetermined period of movement of said movable magnet in order to establish a corresponding synchronous speed of rotation of said shaft.

7. In combination, a rotatable shaft, a vibratory system having a natural period of vibration, means responsive to rotation of said shaft through a predetermined angular pitch for transmitting a vibratory impulse to said vibratory system, first and second contacts positioned to be alternately closed and opened by vibration of said vibratory system, first and second electric windings, first and second electric circuits respectively including said first and second contacts for respectively energizing said first and second electric windings, and means responsive to energization of either one of said electric windings for rotating said shaft said predetermined angular pitch in order to establish a synchronous speed of rotation of said shaft corresponding to the natural period of vibration of said vibratory system.

RUDOLPH FRANK STEHLIK.

REFERENCES CITED

The following references are of record in the file of this patent:

UNITED STATES PATENTS

| Number | Name | Date |
| --- | --- | --- |
| 1,284,219 | Benjamin | Nov. 12, 1918 |
| 1,292,049 | Rainey | Jan. 21, 1919 |
| 2,492,435 | Ostline | Dec. 27, 1949 |